United States Patent [19]

Masi et al.

[11] Patent Number: 5,382,557

[45] Date of Patent: Jan. 17, 1995

[54] PROCEDURE FOR THE PREPARATION OF A SOLID COMPONENT OF CATALYST FOR THE (CO)POLYMERIZATION OF ETHYLENE

[75] Inventors: Francesco Masi, San Donato Milanese; Renzo Invernizzi, Milan; Angelo Moalli, Castelletto Ticino; Cesare Ferrero, Monza; Francesco Menconi, Massa Macinaia; Lia Barazzoni, Piacenza, all of Italy

[73] Assignee: ECP Enichem Polimeri S.r.l., Milan, Italy

[21] Appl. No.: 911,465

[22] Filed: Jul. 10, 1992

[30] Foreign Application Priority Data

Jul. 12, 1991 [IT] Italy .................. MI91A/001933

[51] Int. Cl.$^6$ .................. A01J 31/00; A01J 25/08
[52] U.S. Cl. .................. 502/107; 502/9; 502/104; 502/111; 502/125; 502/132; 502/134
[58] Field of Search .................. 502/9, 104, 107, 111, 502/125, 132, 134

[56] References Cited

U.S. PATENT DOCUMENTS

| | | | |
|---|---|---|---|
| 3,642,746 | 2/1972 | Kashiwa et al. | 502/125 X |
| 3,901,863 | 8/1975 | Berger et al. | |
| 4,292,200 | 9/1981 | Berger et al. | |
| 4,296,223 | 10/1981 | Berger | |
| 4,421,674 | 12/1983 | Invernizzi et al. | |
| 4,843,049 | 6/1989 | Invernizzi et al. | 502/9 |

FOREIGN PATENT DOCUMENTS

| | | |
|---|---|---|
| 0143339 | 6/1985 | European Pat. Off. . |
| 0281524 | 9/1988 | European Pat. Off. . |
| 1401708 | 7/1975 | United Kingdom . |

*Primary Examiner*—Asok Pal
*Assistant Examiner*—E. D. Irzinski
*Attorney, Agent, or Firm*—Rogers & Wells; George P. Hoare, Jr.

[57] ABSTRACT

A solid component of catalyst highly active in the (co)-polymerization of ethylene containing titanium, magnesium, aluminum, chlorine and alkoxy groups, and obtained by means of a procedure wherein:

(i) a solid, granular support of magnesium chloride, obtained by spray-drying an alcohol solution of magnesium chloride, is suspended in a liquid hydrocarbon solvent and an aliphatic alcohol and a titanium tetraalkoxide are added to the suspension thus obtained, (ii) the suspension of step (i) is heated until a homogeneous solution is obtained and the solution is cooled to precipitate a granular solid in a relative suspension, (iii) the granular solid obtained in step (ii), in the relative suspension, is put in contact and reacted with an aluminum alkyl halide, and (iv) the solid component catalyst is recovered from the reaction products of step (iii).

12 Claims, No Drawings

PROCEDURE FOR THE PREPARATION OF A SOLID COMPONENT OF CATALYST FOR THE (CO)POLYMERIZATION OF ETHYLENE

DESCRIPTION

The present invention relates to a procedure for the preparation of a solid component of catalyst, and the use of said component in procedures for the (co)polymerization of ethylene.

It is well-known that ethylene, or α-olefins in general, can be polymerized by means of the procedure at low pressure on Ziegler-Natta catalysts. These catalysts are generally composed of a compound of elements from sub-group IV to sub-group VI of the Periodic Table (compounds of transition metals), mixed with an organometallic compound, or hydride, of elements from groups I to III of the Periodic Table.

Solid components of Ziegler-Natta catalysts are known in the art, containing a transition metal (generally titanium), a bivalent metal (generally magnesium), a halogen (generally chlorine) and possibly also an electron donor. These solid components, combined with an organometallic compound of aluminium, form catalysts which are highly active in procedures for the (co)-polymerization of ethylene in processes carried out at low temperature and pressure. For example U.S. Pat. No. 3,642,746 describes a solid component of catalyst obtained by the contact of a compound of a transition metal with a halide of a bivalent metal treated with an electron donor. According to U.S. Pat. No. 4,421,674 a solid component of catalyst is obtained by the contact of a compound of a transition metal with the product of a spray-dried solution of magnesium chloride in ethanol. According to U.K. Patent 1,401,708 a solid component of catalyst is obtained by the interaction of a magnesium halide, a non-halogenated compound of a transition metal and an aluminium halide. U.S. Pat. Nos. 3,901,863 and 4,292,200 describe solid components of catalyst obtained by putting a non-halogenated compound of magnesium in contact with a non-halogenated compound of a transition metal and an aluminium halide.

U.S. Pat. No. 4,843,049 describes a solid component of catalyst which contains titanium, magnesium, aluminium, chlorine and alkoxy groups, obtained by spray-drying an ethanol solution of magnesium chloride to obtain an active support, which is interacted firstly with a titanium tetraalkoxide and subsequently with an aluminium alkyl chloride. According to the examples given in the patent, this component of catalyst, combined with an aluminium triethyl, gives productivity values (kg of polyethylene per gram of solid component) of about 14-27 and a yield (kg of polyethylene per gram of titanium in the solid component) of about 130-220, in the polymerization of ethylene carried out with the technique in suspension at 90° C., with a hydrogen pressure of 3 atm, a total pressure of about 9 atm and a total polymerization time of 4 hours.

It has now been found, in accordance with the present invention, that a catalyst having a similar composition to that of U.S. Pat. No. 4,843,049 is capable of giving unexpectedly improved productivity and yields in procedures for the polymerization of ethylene when special expedients are used during its preparation.

In accordance with this, the present invention relates to a procedure for the preparation of a solid component of catalyst for the (co)polymerization of ethylene, containing titanium, magnesium, aluminium, chlorine and alkoxy groups, wherein:

(i) a solid, granular support of magnesium chloride, obtained by spray-drying an alcohol solution of magnesium chloride and having a content of alcoholic —OH groups of 18 to 25% by weight, expressed as a weight of ethanol, is suspended in a liquid hydrocarbon solution and an R'—OH aliphatic alcohol is added to the suspension thus obtained, wherein R' represents an alkyl radical, linear or branched, containing 1 to 5 carbon atoms, and a titanium tetra-alkoxide Ti(OR)$_4$, wherein R represents an alkyl radical, linear or branched, containing 1 to 8 carbon atoms, with a molar ratio R'—OH/MgCl$_2$ of 0.5:1 to 1.5:1 and with a molar ratio MgCl$_2$/Ti(OR)$_4$ of 0.3:1 to 3:1, (ii) the suspension of step (i) is heated until a homogeneous solution is obtained and the solution is cooled to precipitate a granular solid, (iii) the granular solid obtained in step (ii), in the relative suspension, is put in contact and reacted with a halide of aluminium alkyl having the formula AlR''$_n$Cl$_{(3-n)}$, wherein R is an alkyl radical, linear or branched, containing 1 to 20 carbon atoms, with a ratio between the chlorine atoms, in said aluminium chloride, and the total alkoxy groups of 0.4:1 to 1.2:1, and (iv) the solid component of catalyst is recovered from the reaction products of step (iii).

The support of magnesium chloride, used in step (i) of the procedure, can be prepared according to the known art, by dissolving anhydrous or basically anhydrous magnesium chloride in ethanol, and spray-drying the solution in a spray-drying apparatus. In particular, the solution is sprayed with a nozzle, or similar device, in the evaporation chamber of a spray-drier and the liquid particles thus formed are put in contact with a flow of inert gas fed into the evaporation chamber in counter-current or equicurrent. Usually the temperature of the gaseous flow at the inlet is about 250°–400° C., the temperature is about the gaseous flow at the outlet of 140°–250° C. and the difference of temperature between the inlet and the outlet flow is at least 40° C. Operating under these conditions, it is possible to recover a solid in particle form from the drier, with an apparent density of 0.38–0.46 g/ml, having a particle size of 1–100 μm (average size 10–20 μm), surface area of 12–17 m$^2$/g, total porosity of 65–85 volume % and content of alcoholic —OH groups of 18 to 25% by weight expressed as a weight of ethanol.

According to the procedure of the present invention, this support is suspended in a liquid hydrocarbon solvent, such as a liquid aliphatic hydrocarbon, for example hexane, pentane, decane and dodecane, and a titanium tetra-alkoxide is added to the solution thus obtained, which can be selected from titanium tetra n-propoxide, titanium tetra n-butoxide, titanium tetra i-propoxide and titanium tetra i-butoxide. The preferred compound is titanium tetra n-butoxide. An aliphatic alcohol, such as methanol, ethanol, propanol, isopropanol, n-butanol and n-pentanol is also added to the suspension. The preferred aliphatic alcohol is n-butanol. In the preferred embodiment, the molar ratio R'—OH/MgCl$_2$ is 1.5:1 and the molar ratio MgCl$_2$/Ti(OR)$_4$ is about 1:1.

The suspension thus obtained is heated in step (ii) to temperatures of 80°–100° C., until a homogeneous solution is obtained and this solution is cooled, preferably gradually to room temperature (20°-25° C.) or to a value close to room temperature to cause the formation of a solid precipitate. This precipitate is normally in the form of pellets having a particle size which varies from 10 to 100 μm (average size 30-45 μm), with an apparent density of 0.45 to 0.5 g/ml, a surface area of 7-10 m²/g, a porosity of 55-70 volume % and a content of alcoholic —OH groups of 60-65% by weight as R'OH alcohol and 1-5% by weight as ethanol. It has been found that the alcohol is practically absent from the liquid phase of the suspension, the concentration being at values of a few parts per million.

An aluminium chloride normally selected from aluminium diethyl monochloride, aluminium ethyl dichloride and aluminium ethyl sesquichloride is added to the suspension obtained in step (ii) and contact is maintained at a temperature ranging from room temperature (20°-25° C.) to 80° C. for a period of 30 to 120 minutes. In the preferred embodiment, in step (iii) the ratio between the chlorine atoms, in said aluminium chloride, and the total alkoxy groups is 0.75:1, the aluminium chloride, possibly diluted in a hydrocarbon solvent, being fed to the suspension while keeping it at a temperature of 30°-35° C. and subsequently heating the resulting suspension to about 60° C. for about 1 hour.

The solid component of catalyst is finally recovered from the reaction products of step (iii) for example by filtration or decanting and is washed with a hydrocarbon solvent and possibly dried.

The solid component of catalyst obtained by the procedure of the present invention is a spherical granular solid, with a particle size generally within the range of 1 to 30 μm (average size 7-15 μm), with a surface area of 10-20 m²/g, a porosity of 65-85 volume %, apparent density of 0.4-0.5 g/ml, and with the following composition expressed in atomic proportions:

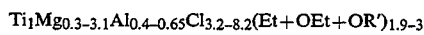

$Ti_1Mg_{0.3-3.1}Al_{0.4-0.65}Cl_{3.2-8.2}(Et+OEt+OR')_{1.9-3}$ wherein R' is an alkyl radical, linear or branched, containing from 1 to 5 carbon atoms and is preferably n-butyl.

Moreover the titanium present in the solid component of catalyst is partly in a trivalent form and partly in a tetravalent form with a ratio between trivalent titanium and total titanium of 0.6:1 to 1:1.

This solid component of catalyst has a chemical composition which is similar to that of the component described in U.S. Pat. No. 4,843,049 cited above, whereas it differs in the values of particle size and surface area which are normally lower. In its use in the polymerization of ethylene under conditions similar to those of U.S. Pat. No. 4,843,049, the component of catalyst of the present invention has a remarkably improved activity, with productivity values and yield of polyethylene of about 37-55 and 280-430 respectively.

The present invention also relates to a catalyst for the (co)polymerization of ethylene composed of the solid component of catalyst described above and an organometallic compound of aluminium, especially an aluminium trialkyl wherein the alkyl contains from 2 to 6 carbon atoms. The preferred aluminium trialkyl is aluminium triethyl. Normally there is an atomic ratio in the catalyst between the aluminium, in said aluminium trialkyl, and the titanium, in the solid component of catalyst, of 50:1 to 200:1.

This catalyst is suitable for the polymerization of ethylene and the copolymerization of ethylene with α-olefins containing from 3 to 8 carbon atoms, such as propylene and butene-1. The polymerization is generally carried out in suspension, at a temperature of 75° to 95° C., in the presence of hydrogen as moderator, operating under a total pressure of 5 to 15 bar, with a ratio between the ethylene pressure and hydrogen pressure which varies from 1 to 6. The catalyst of the present invention is particularly useful in the polymerization of ethylene in ethylene polymers having a narrow distribution of molecular weight, suitable for processes for injection moulding. In particular, polyethylenes can be obtained having the desired Melt-Index and Shear Sensitivity values and a ratio between weight average molecular weight and number average molecular weight.

The experimental examples which follow provide a better illustration of the present invention.

EXAMPLE 1

Preparation of the Solid Component of Catalyst (i) An ethanol solution of magnesium chloride is spray-dried to prepare a solid catalyst support in the form of spherical particles, having a particle size of 3 to 100 μm (average size 15 μm), an apparent density of 0.30 ml/g, surface area of 17 m²/g, porosity of 75 volume %, and a content of alcoholic —OH groups of 22% by weight (expressed as ethanol). 2.45 g of this support are suspended in 50 ml of anhydrous n-decane in a stirred 250 ml reactor, 2.8 ml of n-butanol and 7 g of titanium tetra-n-butoxide are added to the suspension.

(ii) The suspension is heated to 100° C. for 60 minutes, operating under vacuum. A limpid solution is obtained which is cooled to room temperature (20°-25° C.) with the precipitation of a swollen solid in spherical particles, with a particle size of 10 to 100 μm (average size 35 μm), an apparent density of 0.5 ml/g, surface area of 8 m²/g, porosity of 65 volume %, and content of alcoholic —OH groups of 60% by weight (expressed as butanol).

(iii) 11 g of diethyl aluminium chloride dissolved in 50 ml of n-decane [ratio between the chlorine atoms in the diethyl aluminium chloride and the total alkoxy groups (OEt+OBu)=0.75:1] are added dropwise to the stirred solution kept at a temperature of 35° C. At the end of the addition the suspension is heated for 1 hour at 60° C.

(iv) the solid is filtered on a porous glass septum. 8 g of a solid component of catalyst are thus obtained, which are washed with three 100 ml portions of n-decane.

The component of catalyst thus obtained has the following characteristics:
  titanium content: 11% by weight, with a ratio between the titanium in the trivalent state and total titanium (trivalent plus tetravalent) of 0.80:1;
  magnesium content: 7.9% by weight;
  aluminium content: 2.1% by weight;
  chlorine content: 36.3% by weight, and
  content of organic fraction: 42.7% by weight; the organic fraction is basically composed of ethyl groups (Et), ethoxy groups (OEt) and n-butoxy groups (OBu).

Expressing the components according to their atomic proportions, the composition of the catalyst may be represented by the formula:

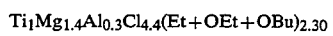

$Ti_1Mg_{1.4}Al_{0.3}Cl_{4.4}(Et+OEt+OBu)_{2.30}$ wherein OEt represents 3.7% and OBu 30.8% by weight of the total.

Polymerization of Ethylene 1,820 ml of anhydrous n-heptane, 0.35 g of aluminium triethyl and 16 mg of the solid component of catalyst prepared as described above are charged, in order, into a stirred 5 liter reactor. The temperature of the reactor is brought to 90° C. and the reactor is pressurized with 3.8 atm of hydrogen and ethylene is then fed to 9 atm, this pressure being kept for the next 4 hours with the continual feeding of ethylene. At the end of this period the polymerization is interrupted and 20 ml of a 10% by weight alcohol solution of ionol is fed into the reactor. The polymer is then filtered and dried. 696 g of polyethylene are obtained with the following values:

productivity: 43.5, expressed as kg of polyethylene per gram of solid component of catalyst, and yield: 400, expressed as kg of polyethylene per gram of titanium in the solid component of catalyst.

The polyethylene thus produced is in the form of free-flowing granules with an average diameter of 250 μm, fine content (<74 μm) of 2.3%, with an apparent density of 0.41 g/ml and having the following characteristics:

Melt-Index (ASTM D 1238): 7 g/10 min.,

Shear Sensitivity (ASTM D 1238): 27,

Mw/Mn (ratio between the weight average molecular weight and number average molecular weight): 3.85, density (ASTM D 2839): 0.9615 g/ml.

EXAMPLE 2

Preparation of the Solid Component of Catalyst 2.45 g of the support described under (i) in Example 1 are suspended in 50 ml of anhydrous n-decane in a stirred 250 ml reactor. 2.8 ml of n-butanol and 7 g of titanium tetra-n-butoxide are added to the suspension. The suspension is heated to 80° C. for 60 minutes, operating under nitrogen to obtain a solution and the resulting solution is cooled to room temperature (20°–25° C.) with the precipitation of a swollen solid in the form of spherical particles, with a particle size of 20 to 100 μm (average size 45 μm), having an apparent density of 0.45 ml/g, a surface area of 7 m²/g, porosity of 63 volume %, and content of alcohol hydroxyls of 55% by weight (expressed as butanol).

6.8 g of ethyl aluminium sesquichloride dissolved in 50 ml of n-decane [ratio between the chlorine atoms in the ethyl aluminium sesquichloride and the total alkoxy groups (OEt+OBu)=0.75:1] are added dropwise to the stirred solution kept at a temperature of 35° C. At the end of the addition the suspension is heated for 1 hour to 60° C.

The solid is filtered on a porous glass septum. 7.5 g of a solid component of catalyst are thus obtained, which are washed with three 100 ml portions of n-decane.

The component of catalyst thus obtained has the following characteristics:

titanium content: 12.8% by weight, with a ratio between the titanium in its trivalent state and the total titanium (trivalent plus tetravalent) of 0.70:1;
magnesium content: 8.2% by weight;
aluminium content: 2.1% by weight;
chlorine content: 36.7% by weight, and
content of organic fraction: 40.2% by weight.

Expressing the components according to their atomic proportions, the composition of the catalyst can be represented by the formula:

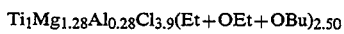

$Ti_1Mg_{1.28}Al_{0.28}Cl_{3.9}(Et+OEt+OBu)_{2.50}$ wherein OEt represents 4.7% and OBu 28.3% by weight of the total.

Polymerization of Ethylene

Ethylene is polymerized using the same procedure as in Example 1 with aluminium triethyl and 14 mg of the solid component of catalyst prepared as described above.

770 g of polyethylene are obtained, with a productivity value of 55 and a yield of 429, expressed as indicated in Example 1.

The polyethylene thus produced is in the form of free-flowing granules with an average diameter of 240 μm, fine content (<74 μm) of 3.3%, an apparent density of 0.40 g/ml and having the following characteristics:

Melt-Index (ASTM D 1238): 5.2 g/10 min.,

Shear Sensitivity (ASTM D 1238): 27.4,

Mw/Mn (ratio between weight average molecular weight and number average molecular weight): 3.95, density (ASTM D 2839): 0.9625 g/ml.

EXAMPLE 3

Preparation of the Solid Component of Catalyst 21 kg of the support described in (i) in Example 1, 85 l of anhydrous n-decane and 59.2 kg of titanium tetra-n-butoxide are charged, in this order, into a stirred 500 l reactor. 19.2 kg of anhydrous n-butanol are added to the stirred suspension kept at room temperature, the suspension heated to 120° C. for 2 hours and then cooled to room temperature. A swollen solid precipitates in the form of spherical particles, with an average size of 10 to 100 μm (average size 30 μm), having an apparent density of 0.48 ml/g, a surface area of 10 m²/g, porosity of 68 volume %, and a content of alcoholic —OH groups of 60.4% by weight, 58% of which is expressed as butanol and 2.4% is expressed as ethanol).

66.2 kg of ethyl aluminium sesquichloride are added to the suspension kept at 35° C., with a ratio between the chlorine atoms in the ethyl aluminium sesquichloride and the total alkoxy groups of 0.75:1. At the end of the addition the suspension is heated for 1 hour at 60° C.

After the suspension has been cooled, the solid is filtered and washed with 300 l of anhydrous n-decane.

64.2 kg of a solid component of catalyst is obtained, with the following characteristics:

titanium content: 13.1% by weight, with a ratio between the titanium in its trivalent state and the total titanium (trivalent plus tetravalent) of 0.70:1;
magnesium content: 6.28% by weight;
aluminium content: 0.88% by weight;
chlorine content: 38.56% by weight, and
content of organic fraction: 41.2% by weight.

Expressing the components according to their atomic proportions, the composition of the catalyst can be represented by the formula:

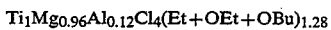

$Ti_1Mg_{0.96}Al_{0.12}Cl_4(Et+OEt+OBu)_{1.28}$ wherein OEt represents 1.2% and OBu 29.0% by weight of the total.

Polymerization of Ethylene

Ethylene is polymerized using the same procedure as described in Example 1 with 0.35 g of aluminium triethyl and 16 mg of the solid component of catalyst prepared as described above.

592 g of polyethylene are obtained with a productivity value of 37 and a yield of 282, expressed as indicated in Example 1.

The polyethylene thus produced is in the form of free-flowing granules with an average diameter of 225 μm, fine content (<74 μm) of 2.8%, an apparent density of 0.44 g/ml and having the following characteristics:

Melt-Index (ASTM D 1238): 6.7 g/10 min.,
Shear Sensitivity (ASTM D 1238): 28,
Mw/Mn (ratio between weight average molecular weight and number average molecular weight): 3.75,
density (ASTM D 2839): 0.9620 g/ml.

EXAMPLE 4

Polymerization of Ethylene

The solid component of catalyst obtained in Example 3 is used in a polymerization test of ethylene carried on a large scale.

In particular, a 40 m³ reactor is used with a temperature inside the reactor of 90° C., a total pressure of 10 atm and with a ratio ethylene/hydrogen of 1:1, feeding 6,000 kg/hour of hetpane, 80 g/hour of the solid component of catalyst and 0.53 kg/hour of aluminium triethyl. The concentration of the pulp is 390 g/l and the residence time 3.5 hours.

Under these conditions a productivity of 40 and a yield of 305 are obtained, these values being expressed as indicated in Example 1.

The polyethylene thus produced is in the form of free-flowing granules with an average diameter of 270 μm, fine content (<74 μm) of 3%, an apparent density of 0.38-0.40 g/ml and with the following characteristics:

Melt-Index (ASTM 1238): 6.5-7.5 g/10 min.,
Shear Sensitivity (ASTM 1238): 27-28,
density (ASTM 2839): 0.9620-0.9630 g/ml
Izod (ASTM D 256): 125 Joule/m.

What is claimed is:

1. Process for the preparation of a solid component of catalyst for the (co)polymerization of ethylene, and containing titanium, magnesium, aluminium, chlorine and alkoxy groups, wherein said process comprises:
   (i) obtaining a solid granular support of magnesium chloride by spray-drying an ethanol solution of magnesium chloride, said support having a content of alcoholic —OH groups of 18 to 25% by weight, expressed as a weight of ethanol, suspending the support in a liquid hydrocarbon solvent and adding to the suspension n-butanol and titanium tetra-n-butoxide, with a molar ratio n-butanol/MgCl$_2$ of 0.5:1 to 1.5:1 and with a molar ratio MgCl$_2$/titanium tetra-n-butoxide of 0.3:1 to 3:1,
   (ii) heating the suspension of step (i) until a homogeneous solution is obtained and cooling the solution to precipitate a granular solid and form a relative suspension,
   (iii) contacting and reacting the granular solid obtained in step (ii), in the relative suspension of step (ii), with an aluminium alkyl chloride selected from the group consisting of aluminium diethyl monochloride, aluminium ethyl dichloride and aluminium ethyl sesquichloride, with a ratio between the chlorine atoms, in the aluminium chloride, and the total alkoxy groups of 0.4:1 to 1.2:1, and
   (iv) recovering the solid component of catalyst from the reaction products of step (iii).

2. Process according to claim 1, wherein the support of magnesium chloride, used in step (i) has an apparent density of 0.38-0.46 g/ml, a particle size of 1-100 μm, surface area of 12-17 m²/g and a total porosity of 65-85 volume %.

3. Process according to claim 1, wherein in step (ii) the operating temperature is 80°-100° C., until a homogeneous solution is obtained and said solution is cooled, to or about room temperature (20°-25° C.) to cause the formation of a solid precipitate.

4. Process according to claim 1, wherein in step (iii) the temperature ranges from 20° C. to 80° C. for a period of 30 to 120 minutes.

5. Process according to claim 4, wherein in said step (iii) the ratio between the chlorine atoms, in said aluminium chloride, and the total alkoxy groups is 0.75:1, feeding the aluminium chloride into the suspension kept at a temperature of 30°-35° C. and heating the resulting suspension to 60° C. for 1 hour.

6. Solid component of catalyst obtained in the process of claim 1 and comprising a spherical granular solid, with a particle size within the range of 1 to 30 μm, a surface area of 10-20 m²/g, a porosity of 65-85 volume %, an apparent density of 0.4-0.5 g/ml, and with the following composition expressed in atomic proportions:

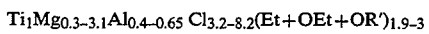

$$Ti_1Mg_{0.3-3.1}Al_{0.4-0.65}Cl_{3.2-8.2}(Et+OEt+OR')_{1.9-3}$$

wherein R' is normal butyl and wherein the titanium is partly in a trivalent form and partly in a tetravalent form with a ratio between the trivalent titanium and total titanium of 0.6:1 to 1.1.

7. Catalyst for the (co)polymerization of ethylene comprised of the solid component of catalyst according to claim 6 and an aluminium trialkyl, with an atomic ratio between the aluminium, in said aluminium trialkyl, and the titanium, in said solid component of catalyst, of 50:1 to 200:1.

8. A process according to claim 2, wherein the support of magnesium chloride has an average particle size of about 10-20 microns.

9. A process according to claim 3, cooling the solution gradually to about room temperature to cause the formation of a solid precipitate.

10. A process according to claim 5, additionally comprising diluting the aluminum chloride in a hydrocarbon solvent.

11. Catalyst according to claim 7, wherein the aluminum trialkyl is aluminum triethyl.

12. Process according to claim 1, wherein in step (i) the molar ratio n-butanol/MgCl$_2$ is 1.5:1 and the molar ratio MgCl$_2$/titanium-tetra-n-butoxide is 1:1.

* * * * *